April 16, 1957     O. B. SURBER     2,788,598
ARTIFICIAL TREE
Filed May 24, 1955
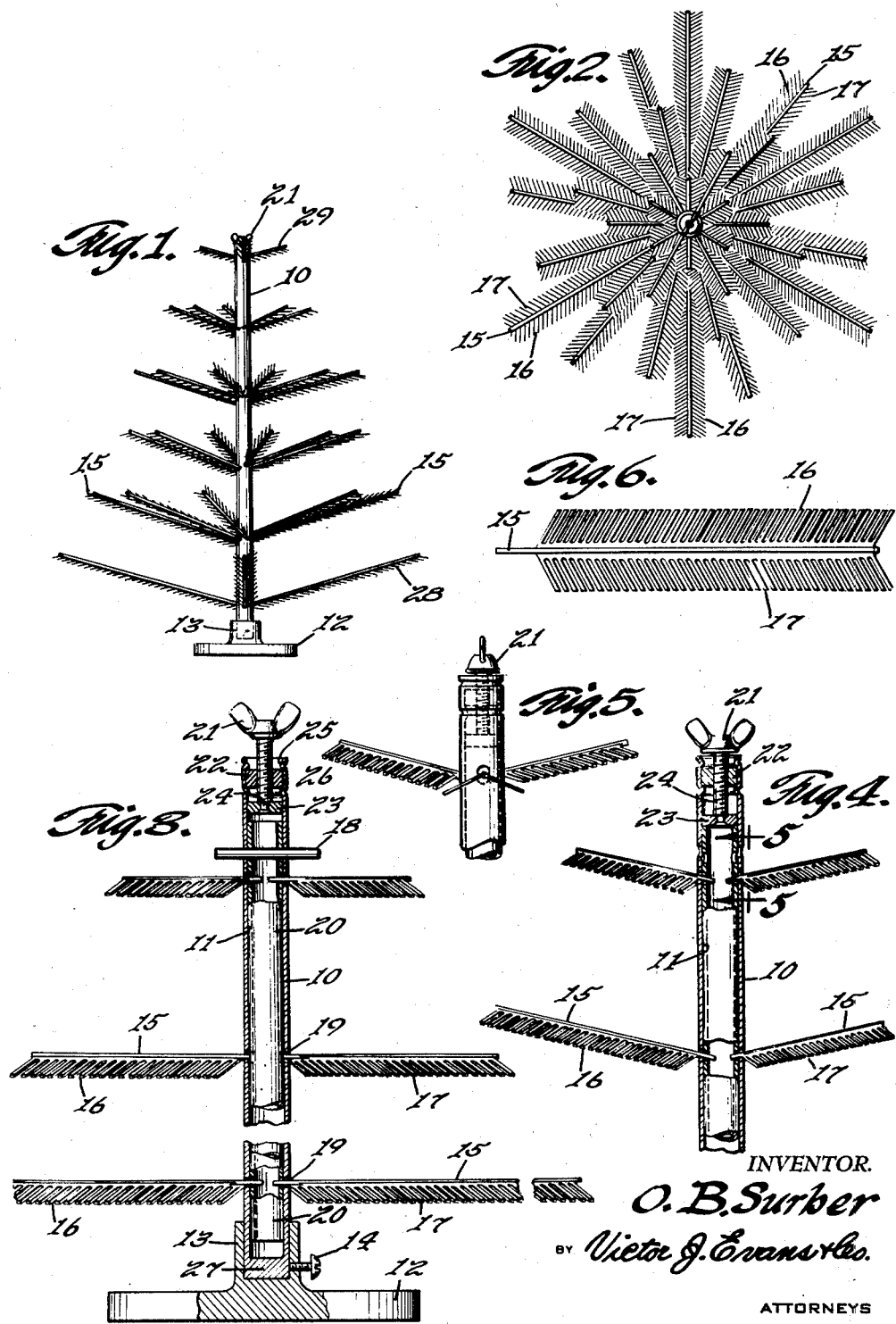
INVENTOR.
O. B. Surber
BY Victor J. Evans & Co.
ATTORNEYS

United States Patent Office 2,788,598
Patented Apr. 16, 1957

2,788,598

ARTIFICIAL TREE

Otis B. Surber, South Gate, Calif.

Application May 24, 1955, Serial No. 510,639

5 Claims. (Cl. 41—15)

This invention relates to imitation or artificial trees used for decorative purposes and particularly for Christmas trees, and in particular, a tree having a trunk formed with telescoping tubes removably supported in a base and having rods with fringe extended from sides thereof clamped by the tubes and providing branches simulating branches of a tree.

The purpose of this invention is to provide an artificial tree, simulating a Christmas tree wherein the parts are readily assembled and wherein the parts are adapted to be taken apart and packed for storage and shipping.

Considering the number of conventional Christmas trees, such as pine, spruce, and cedar, the forest reserves, in some parts of the country, are rapidly being depeted and although additional trees are being planted in quantities the number of trees destroyed is far in excess of the trees planted.

Furthermore, Christmas trees are harvested in the fall and are relativey dry when used so that they present a continuous fire hazard and, particulary with electric light cords extended through the trees, numerous fires are started by such trees.

Although decorative trees are used primarily at Christmas, or in the Christmas season, numerous trees are used for decorating, particularly in funeral parlors, department stores, school auditoriums, and other places and during certain seasons of the year it is difficult to obtain pine, spruce, and cedar trees for such use.

With this thought in mind, this invention contemplates providing an artificial tree that is substantially a duplicate of a tree normally used as a Christmas tree and that is adapted to be re-used from year to year.

The object of this invention is, therefore, to provide means for forming an artificial tree wherein the tree is adapted to be used for decorative purposes and wherein the tree is adapted to be readily taken apart and packed for storage.

Another object of the invention is to provide an artificial tree that is adapted to be supplied in a relatively small package and that is adapted to be assembled by the average layman or housewife.

A further object of the invention is to provide an artificial tree adapted to be used for decorative purposes in which the tree is of a simple and economical construction.

With these and other objects and advantages in view, the invention embodies a base plate having a hub extended upwardly from the upper surface, a tubular casing having staggered openings through the wall thereof adapted to be secured in the hub of the base with a set screw, an inner casing or rod slidably mounted in the outer casing and having openings therein positioned to register with the openings of the outer casing, a master pin for positioning the inner and outer elements, a plurality of rods having fringe extended from edges thereof adapted to be inserted in the openings of the inner and outer casings, and a thumb screw adapted to adjust the position of the inner casing in relation to the outer casing whereby the rods having the fringe extended from edges thereof are adjusted to upwardly inclined positions to represent branches of a tree.

Other features and advantages of the invention will appear from the following description, taken in connection with the drawing, wherein:

Figure 1 is a side elevational view illustrating the improved artificial tree.

Figure 2 is a plan view of the artificial tree.

Figure 3 is a vertical section through the tree, with the parts shown on an enlarged scale and with parts broken away showing the branches in horizontally disposed positions in which positions the branches are adapted to be removed and replaced.

Figure 4 is a vertical section, similar to that shown in Figure 3, showing the upper portion of the tree with the inner casing adjusted in relation to the outer casing to move the branches to upwardly inclined positions.

Figure 5 is a side elevational view taken on line 5—5 of Figure 4 showing a portion of the upper end of the tree.

Figure 6 is a plan view of one of the branches showing the fringe extended from sides of a rod with one end of the rod extended to provide mounting means of the branch in openings in the trunk of the tree.

Referring now to the drawing, wherein like reference characters denote corresponding parts, the artificial tree of this invention includes an outer tubular casing 10, an inner tube 11, a base 12 having a hub 13 with a set screw 14 therein extended upwardly from the upper surface, rods 15 having fringe, as indicated by the numerals 16 and 17, extended from sides thereof, a master pin 18 for retaining the outer casing 10 and tube 11 in positions wherein openings 19 of the casing are in registering relation with openings 20 of the tube 11 so that the ends of the rods 15 are adapted to be inserted through the openings, a thumb screw 21 threaded in a nut or plug 22 in the upper end of the casing 10 and a washer 23 secured to the inner end of the thumb screw and adapted to engage the end of the tube 11 for actuating the tube from the position shown in Figure 3 to that shown in Figure 4 wherein the openings 20 are forced downwardly in relation to the openings 19 and the rods 15 of the branches are actuated to upwardly inclined positions.

The inner end of the thumb screw 21 is provded with a stud 24 that extends through an opening in the washer 23 and the end of the stud is peened to secure the washer 23 to the end of the thumb screw.

The plug 22 is secured in position by annular ridges 25 and 26 formed by annular indentations impressed into the outer surface of the casing, and the lower end of the outer casing may also be provided with a plug 27 that may be secured in position by brazing or the like.

The openings 19 and 20 are positioned in vertically disposed staggered rows whereby the rods 15 with the fringe elements 16 and 17 are adapted to be radially positioned, as illustrated in Figure 2, to represent branches of a tree, the length of the rods and branches diminishing from the branches at the lower end of the trunk, as indicated by the numeral 28, to comparatively short branches 29, at the upper end.

The positions of the openings and also the relative spacing of the groups of the openings are adapted to be varied to represent different types of trees, such as pine, cedar, spruce, and the like.

With the parts formed as illustrated and described, the outer and inner tubes are adapted to be adjusted to the positions illustrated in Figure 3 wherein the openings of the tubes are in registering relation and with the master pin 18 inserted the openings are retained in this position as the branches are inserted and with the ends of the rods 15 extended through the openings, as shown in Figure 3, the master pin 18 is removed and the thumb screw 21 turned until the washer 23 forces the inner tube downwardly to the position illustrated in Figure 4 wherein the extended portions of the branches are inclined upwardly and with continued movement of the thumb screw the ends of the rods 15 are clamped in the openings between the telescoping tubes.

By this means the telescoping tubes, forming the trunk, may readily be removed from the base and the branches removed from the telescoping tubes so that the device is adapted to be packed in a relatively small carton.

The parts may be formed of aluminum or other metal or of a suitable non-inflammable plastic material.

It will be understood that other modifications, within the scope of the appended claims, may be made in the design and arrangement of the parts without departing from the spirit of the invention.

What is claimed is:

1. An artificial tree comprising a pair of telescoping tubes providing a trunk of a tree, said tubes having openings therethrough and the tubes being adapted to be positioned with the openings of one tube in registering relation with the openings of the other tube, means for supporting the tubes in vertically disposed positions, rods having fringe thereon providing branches positioned with ends thereof adapted to be inserted into the openings of the tubes, an internally threaded plug mounted in the upper end of one of said tubes and a thumb screw with a washer on the inner end threaded in said plug and adapted to actuate said one tube longitudinally of the other tube for simultaneously clamping the rods in said openings.

2. An artificial tree comprising a pair of telescoping tubes providing a trunk of a tree, said tubes having openings therethrough and the tubes being adapted to be positioned with the openings of one tube in registering relation with the openings of the other tube, means for supporting the tubes in vertically disposed positions, rods having fringe thereon providing branches positioned with ends thereof adapted to be inserted into the openings of the tubes, an internally threaded plug mounted in the upper end of one of said tubes and a thumb screw with a washer on the inner end threaded in said plug for adjusting said one tube in longitudinal relation to the other of said tubes whereby the branches are inclined upwardly from the tubes, and means for simultaneously clamping the branches in the upwardly inclined positions.

3. In an artificial tree, the combination which comprises an outer tubular casing, an inner tube positioned in said casing, said casing and tube having openings in walls thereof and said tubes being adapted to be positioned with the openings in registering relation, a base having a hub in which the lower end of the casing is positioned for supporting the casing and tube in vertically disposed positions, rods having fringe on sides thereof adapted to be positioned with ends thereof extended into openings of the casing and tube, an internally threaded plug mounted in the upper end of said casing and a thumb screw with a washer on the inner end threaded in said plug for adjusting the position of the tube in longitudinal relation to the casing whereby the longitudinal axes of the rods are inclined upwardly.

4. In an artificial tree, the combination which comprises an outer tubular casing, an inner tube positioned in said casing, said casing and tube having openings in walls thereof and said tubes being adapted to be positioned with the openings in registering relation, a base having a hub in which the lower end of the casing is positioned for supporting the casing and tube in vertically disposed positions, rods having fringe on sides thereof adapted to be positioned with ends thereof extended into openings of the casing and tube, an internally threaded plug mounted in the upper end of the casing and a thumb screw with a washer on the inner end threaded in said plug for adjusting the position of the tube in longitudinal relation to the casing whereby the rods are simultaneously inclined upwardly, and means for clamping the ends of the rods extended through the openings of the tube and casing between the tube and casing.

5. In an artificial tree, the combination which comprises a base having a hub with an opening therein extended upwardly from the upper surface, a tubular casing having openings through the wall thereof removably mounted in the opening of the hub of the base, an inner tube also having openings through the wall thereof slidably mounted in the tubular casing, a positioning pin adapted to extend through openings of the casing and tube for retaining the casing and tube in position with openings thereof in registering relation, rods having fringe extended from edges thereof adapted to be positioned with ends extended through the openings of the casing and tube, an internally threaded plug mounted in the upper end of the casing and a thumb screw with a washer on the inner end threaded in said plug and adapted to actuate the tube longitudinally of the casing for adjusting the positions of the rods having the fringe extended from edges thereof, said thumb screw and washer also providing means for clamping the rods in the casing and tube.

References Cited in the file of this patent
UNITED STATES PATENTS

| 891,301 | Spreen | June 23, 1908 |
| 2,675,256 | Cornell | Apr. 13, 1954 |

FOREIGN PATENTS

| 508,492 | Canada | Dec. 28, 1954 |